United States Patent [19]

Fournier

[11] 3,918,758
[45] Nov. 11, 1975

[54] REMOTELY RELEASABLE SELF-LATCHING SNAP HOOK

[75] Inventor: Paul J. E. Fournier, Jackson, Mich.

[73] Assignee: Aeroquip Corporation, Jackson, Mich.

[22] Filed: July 18, 1974

[21] Appl. No.: 489,840

[52] U.S. Cl. .............. 294/83 R; 24/233; 24/241 SB
[51] Int. Cl.² ........................................... B66C 1/38
[58] Field of Search ........ 294/75, 78 R, 82 R, 83 R, 294/83 A, 83 AB, 84; 24/230.5 CR, 230.5 S, 230.5 TH, 232, 233, 234, 235, 241 R, 241 P, 241 PP, 241 PS, 241 SP, 241 SB, 242

[56] References Cited
UNITED STATES PATENTS

| 998,524 | 7/1911 | Jordan | 294/84 |
| 1,546,208 | 7/1925 | Cunningham | 24/241 SB |
| 1,576,197 | 3/1926 | Kuffel et al. | 294/83 R |
| 1,622,971 | 3/1927 | Porter | 24/241 P |
| 2,490,558 | 12/1949 | Sullivan | 294/83 A |
| 2,863,201 | 12/1958 | Craven et al. | 24/233 |
| 3,539,217 | 11/1970 | Szekely | 294/83 A |

Primary Examiner—Evon C. Blunk
Assistant Examiner—Johnny D. Cherry
Attorney, Agent, or Firm—Beaman & Beaman

[57] ABSTRACT

A snap hook of economical construction particularly suitable for lifting and conveying loads wherein a load attachment member, such as a ring, may be slipped into a hook opening and retained therein by a spring biased keeper. After the load weight is relieved from the hook manual operation of a pivoted release lever lifts the load ring from the hook opening, and the keeper is simultaneously removed from the hook opening and released. Spring means return the release lever to the relatching position. The release lever is engaged by the load ring when under load and this safety feature prevents accidental release of the load.

3 Claims, 5 Drawing Figures

U.S. Patent   Nov. 11, 1975   3,918,758
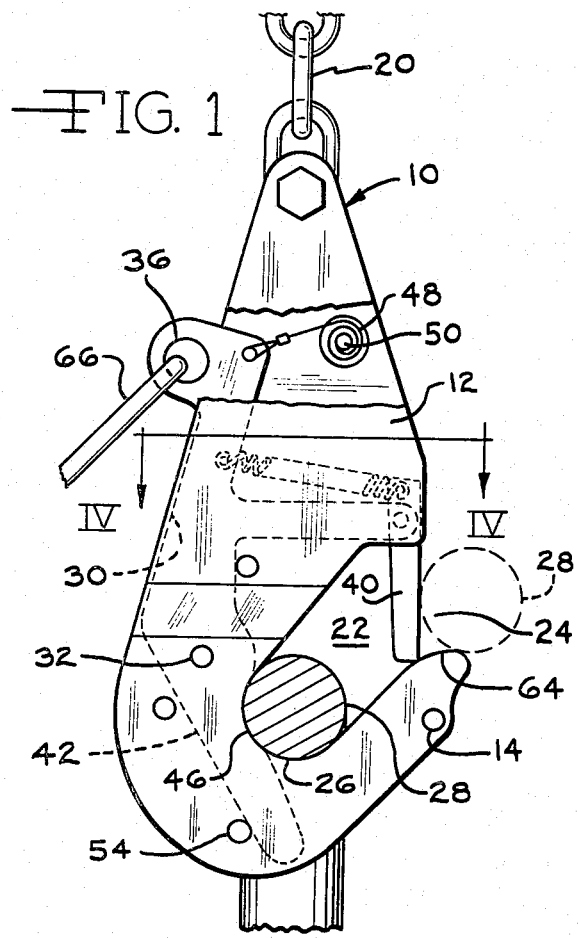
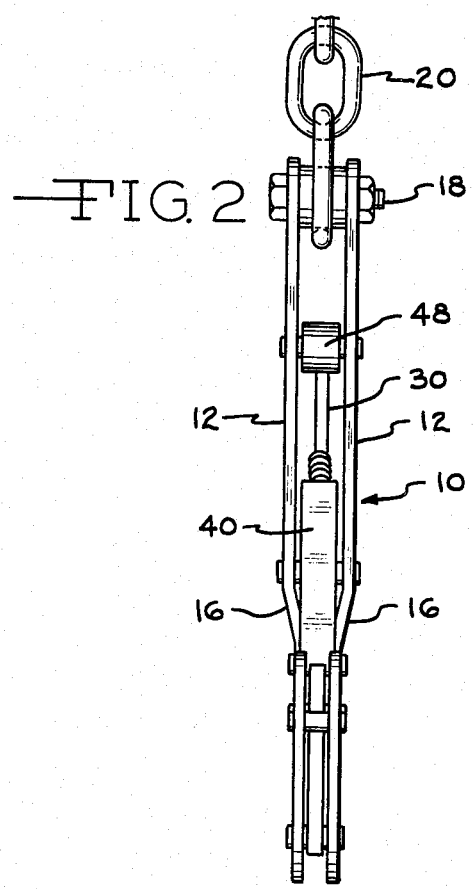
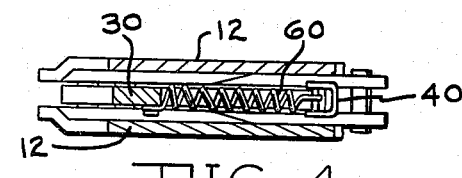
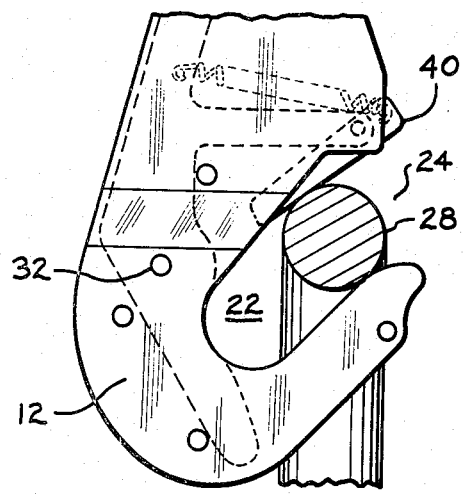
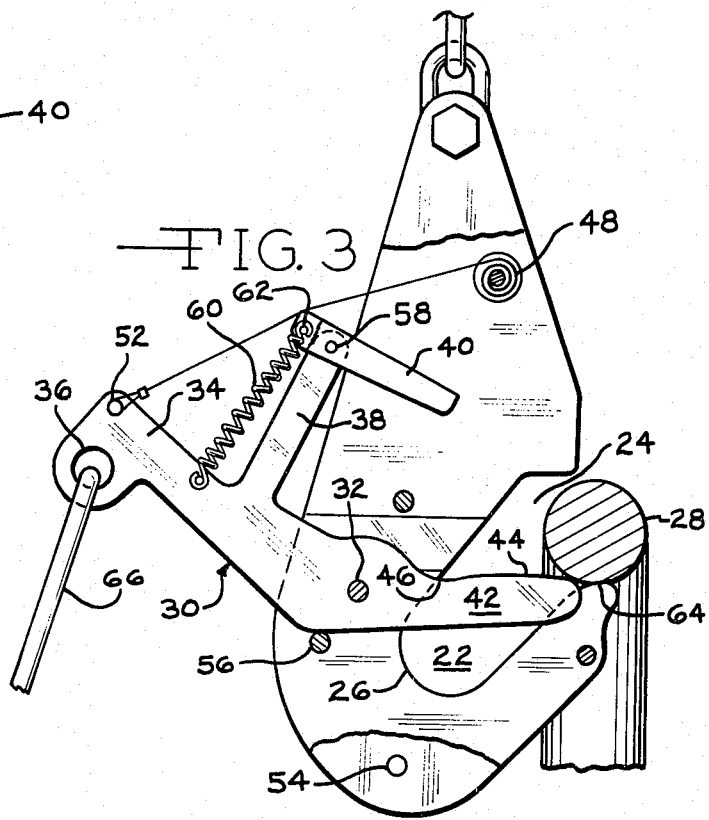

REMOTELY RELEASABLE SELF-LATCHING SNAP HOOK

BACKGROUND OF THE INVENTION

The invention pertains to load bearing hook devices utilizing spring biased keepers and means for remotely removing the load attachment member from the hook upon removal of the load weight from the hook.

Snap hooks are commonly used for load carrying and other purposes wherein a keeper, usually spring biased, is located within the hook opening throat to prevent the load carrying cable, ring, or the like, from being accidentally removed from the hook opening. Such keepers require a positive operation of the keeper against a spring force to permit the load ring to be removed from the hook opening.

While conventional snap hooks function well and efficiently, the fact that with the utilization of both hands, the keeper must be manually held back from the hook opening throat while the load ring is removed from the hook opening requires direct access to the hook by the operator. In some uses of load bearing snap hooks it is desirable to remove the load attachment means from the hook opening with one hand even though the hook is remotely located with respect to the operator tending the load and such hooks have not heretofore been available.

SUMMARY OF THE INVENTION

It is an object of the invention to provide a snap hook which is capable of receiving a load attachment member, and maintaining the load attachment member within the hook opening by means of a keeper, yet the load attachment member may be removed from the hook opening by a simple remotely produced operation.

In the practice of the invention the components of the snap hook are formed by low cost production techniques, the operation of the load attachment release means is simple and foolproof and the keeper utilized with the hook meets safety requirements by preventing accidental release of the load attachment member from the hook opening.

The snap hook in accord with the invention includes a hook body having a hook opening defined therein. The throat of the hook opening is selectively closed by a pivotally mounted keeper. The load attachment member may be remotely removed from the hook opening by the pivoting of a release lever mounted upon the hook body. The release lever includes a portion which moves through the hook opening from the latched position to the load attachment release position, and the keeper is mounted upon the release lever so as to be removed from the hook opening during operation of the release lever and thereby permit release of the load.

Spring means biases the release lever toward the latched position, and at such position the keeper is located within the hook opening throat and is biased by spring means to a closed position sealing the throat. The load attachment member, such as a load ring, may be easily slipped past the keeper by engaging the keeper and pivoting the same from the throat in the conventional manner known in the snap hook art. The mounting of the keeper upon the relase lever prevents the keeper from interfering with the removal of the load ring during release of the ring from the hook opening once the load has been removed from the load ring.

The majority of the components in accord with the hook construction in accord with the invention are formed of plate and sheet material which is readily fabricated by stamping operations, and the construction of the snap hook permits a versatile and safe remotely controllable hook to be manufactured at a relatively inexpensive cost.

BRIEF DESCRIPTION OF THE DRAWINGS

The aforementioned objects and advantages of the invention will be appreciated from the following description and accompanying drawings wherein:

FIG. 1 is an elevational view, partially sectioned, illustrating a snap hook in accord with the invention with the release lever shown in the latched position, FIG. 2 is an elevational view of the hook as taken from the right of FIG. 1, FIG. 3 is a detail, elevational, sectional view of the snap hook with the release lever shown in the load attachment member release position, FIG. 4 is a sectional view as taken along section IV–IV of FIG. 1, and FIG. 5 is a detail, elevational view showing the keeper being displaced by a load attachment member.

DESCRIPTION OF THE PREFERRED EMBODIMENT

The snap hook in accord with the invention includes a body 10 formed by a pair of similar sheet metal plates 12 maintained in spaced parallel relationship by a plurality of spacer rivets such as at 14. The configuration of the plates 12 will be appreciated from FIGS. 1 and 2 wherein it will be noted that an offset 16 is formed in the plates so that the upper portion of the hooks are spaced a greater distance apart than the lower portion, FIG. 2.

The upper portions of the plates 12 are each provided with a hole for receiving the support member attachment bolt 18. A chain 20, or cable, is usually attached to the bolt 18 for supporting the hook, and the load which is suspended therefrom. The chain 20 is suspended from any conventional load bearing device such as a crane, derrick, strong-back, etc.

The lower portion of the plates 12 are formed with a hook opening or notch 22 which is inclined in a vertical manner having a throat 24 formed at the upper portion of the opening, and the lower portion defines a load bearing surface 26. Of course, both plates 12 have identical hook openings formed therein wherein the openings together define the opening 22 hereinafter referred to in the singular form.

The load attachment member may be in the form of a cable loop, chain link, load ring, or the like. For purpose of illustration a load ring 28 is illustrated within the hook opening, FIG. 1, and the load, not shown, is suspended from the load ring in the known manner.

A load attachment release lever 30 of a flat sheet material is pivotally mounted between the plates 12 on the pivot rivet 32. The release lever 30 includes an upwardly extending arm portion 34 having a lanyard attachment hole 36 defined thereon. The lever also includes a keeper support arm 38 which normally extends above the hook opening 22 and serves as the support for the keeper finger 40, as will be later described. Additionally, the release lever includes a downwardly extending load attachment member engaging portion 42 which includes a contoured lifting surface 44, which includes a radius 46 substantially corresponding to the configuration of the hook opening load bearing surface 26 as will be appreciated from FIG. 1.

The release lever 30 is biased to the latched position by a spring, which in the illustrated embodiment, takes the form of a negator spring 48 mounted between plates 12 on pin 50, and anchored to the release arm portion 34 at pin 52. The negator spring 48 will produce a constant biasing force on the release lever at all locations of the lever.

Pivoting of the release lever in the clockwise direction to the latched position is terminated by engagement of the release lever portion 42 with the spacing rivet 54 and counterclockwise rotation is limited by stop rivet 56.

The load ring 28 is maintained within the hook opening 22 by the keeper 40, which is of a U-shaped cross-sectional configuration, FIG. 4, pivotally mounted upon the release lever arm 38 by a pivot pin 58. Tension spring 60 biases the keeper in a counterclockwise direction, and pivoting of the keeper is limited by engagement of the spring anchor pin 62 with the arm portion 38. The other end of the spring 60 is anchored to the lever portion 34. The keeper finger 40 is of sufficient length to substantially extend across the hook opening throat 24 and will prevent the load ring 28 from accidentally being removed from the hook opening 22 when the release lever 30 is in the latched position.

In use, the components of the snap hook will normally be as shown in FIG. 1. The negator spring 48 will bias the release lever 30 to the maximum clockwise latched position and the spring 60 will bias the keeper 40 to the maximum counterclockwise position. The load ring 28 is positioned in alignment with opening 22 by placing the ring on the hook nose surface 64, as shown in dotted lines in FIG. 1, which extends beyond the keeper and the ring is pushed against the outer portion of the keeper to pivot the keeper 40 in a clockwise direction about its pivot 58, FIG. 5, which causes an extension of spring 60. The keeper 40 is displaced sufficiently from the throat 24 to permit the load ring to be completely received within the hook opening so that it may rest on the load bearing surface 26.

The hook and load ring are now capable of lifting and supporting the load, and the keeper will prevent the load ring from releasing from the hook opening 22 under any circumstances, while the engagement of the load ring with lever portion 42 prevents the lever 30 from pivoting and removing keeper 40 from the throat 24.

When it is desired to remove the load ring 28 from the hook opening 22 the hook will be lowered by its supporting chain 20 until the load rests upon a supporting surface and the load weight is removed from the load ring. Thereupon, the operator pulls the lanyard 66 received within the lanyard hole 36 pivoting the release lever 30 in a counterclockwise direction about pivot 32. Such pivoting of the lever 30 causes the lever portion 42 to pass upwardly through the hook opening 22 from the position of FIG. 1 to the position of FIG. 3, lifting the load ring 28 from the bearing support surface 26 and through the throat 24 whereby the load ring may fall from the hook opening as shown in FIG. 3. As appreciated from FIG. 3, the counterclockwise pivoting of the release lever 30 causes the keeper 40 to swing away from the throat 24 opening the throat for passage of the load ring therethrough, and thus the keeper is automatically removed from an operative position during release of the load ring. The pivoting movement of the release lever to its load release position is terminated by engagement of the lever with the stop rivet 56.

After the load ring has been removed from the hook opening 22, the operator releases the lanyard 66 permitting the negator spring 48 to pivot the lever 30 in a clockwise direction to return the lever to the latched position and the components will then be located as shown in FIG. 1 ready for receiving the next load attachment member.

It will be appreciated that the operation of the snap hook in accord with the invention results in a self-latching hook which may be remotely operated to remove the load attachment member therefrom. Hooks of this type are particularly suitable with cargo handling systems wherein the hook will often be located well above the operator's reach even though the load has been removed from the hook, and the automatic return of the hook structure to its latched position assures maximum safety in that there is no manual resetting of the keeper required. Also, the presence of the nose surface 64 facilitates entry of the load ring into the hook opening as the nose surface guides the ring into the opening with a minimum of manual alignment required.

It is appreciated that various modifications to the inventive concept may be apparent to those skilled in the art without departing from the spirit and scope thereof.

I claim:

1. A snap hook for lifting loads characterized by economy of construction and its ability to remotely release the load attachment member and automatically latch comprising, in combination, a body defined by a pair of spaced, parallel plates, support means defined on said plates, a hook opening defined in said plates for receiving a load attachment member, said hook opening having a load-bearing portion and an open throat for receiving a load attachment member, a load attachment member release lever pivotally mounted intermediate said plates for movement between load release and latched positions, said lever having a load attachment engageable portion movable through said hook opening from said load-bearing portion toward said throat during load release movement, a lanyard attached to said lever for moving said lever from said latched position to said load release position to lift a load attachment member from said hook opening, spring means located between said plates biasing said lever toward said latched position, a load attachment member keeper mounted on said lever closing said hook opening throat when said lever is in said latched position and removed from said throat when said lever is in said load release position, said keeper comprising a finger pivotally mounted upon said release lever movable between a throat-closing position and a load attachment member bypass position when said release lever is in said latched position, a nose defined on said body adjacent said open throat extending outwardly beyond said hook opening and defining a load attachment positioning surface on said body on the opposite side of said keeper with respect to said hook opening load bearing portion when said keeper is in said throat closing position and prior to said keeper being displaced by a load attachment member during loading of the hook.

2. In a snap hook for lifting loads as in claim 1 wherein said spring means comprises a negator spring imposing a substantially uniform biasing force on said lever at all positions thereof.

3. In a snap hook for lifting loads as in claim 1, abutment pins interposed between said plates limiting pivoting of said lever between said load release and latched positions.

* * * * *